(12) United States Patent
Schutten et al.

(10) Patent No.: US 11,776,538 B1
(45) Date of Patent: Oct. 3, 2023

(54) SIGNAL PROCESSING

(71) Applicant: Dialog Semiconductor B.V., s-Hertogenbosch (NL)

(72) Inventors: Niels Schutten, Zaandam (NL); Wessel Harm Lubberhuizen, Delden (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 617 days.

(21) Appl. No.: 16/371,323

(22) Filed: Apr. 1, 2019

(51) Int. Cl.
*G10L 15/22* (2006.01)
*G10L 15/08* (2006.01)

(52) U.S. Cl.
CPC .............. *G10L 15/22* (2013.01); *G10L 15/08* (2013.01); *G10L 2015/088* (2013.01); *G10L 2015/223* (2013.01)

(58) Field of Classification Search
CPC ... G10L 15/08; G10L 15/22; G10L 2015/088; G10L 2015/223
See application file for complete search history.

(56) References Cited

U.S. PATENT DOCUMENTS

| 8,948,415 | B1* | 2/2015 | Reid | H04W 52/0238 |
| | | | | 381/94.1 |
| 10,629,226 | B1* | 4/2020 | Tong | G10L 15/08 |
| 2006/0153360 | A1* | 7/2006 | Kellermann | H04M 9/082 |
| | | | | 379/406.08 |
| 2014/0146243 | A1* | 5/2014 | Liu | H04R 5/0335 |
| | | | | 348/838 |
| 2014/0163978 | A1* | 6/2014 | Basye | G10L 15/28 |
| | | | | 704/233 |
| 2016/0372135 | A1* | 12/2016 | Lee | G10L 19/06 |
| 2017/0236528 | A1* | 8/2017 | Lepauloux | G10L 21/0264 |
| | | | | 704/233 |
| 2018/0033436 | A1* | 2/2018 | Zhou | G10L 15/22 |
| 2018/0096689 | A1* | 4/2018 | Basye | G10L 15/28 |
| 2018/0293974 | A1* | 10/2018 | Georges | G10L 15/183 |
| 2018/0324518 | A1* | 11/2018 | Dusan | G10L 25/06 |
| 2018/0366122 | A1* | 12/2018 | Lee | G10L 15/22 |
| 2019/0005953 | A1* | 1/2019 | Bundalo | G06F 1/3287 |
| 2019/0198043 | A1* | 6/2019 | Crespi | G10L 25/84 |

(Continued)

OTHER PUBLICATIONS

"Reconstruction Filter Design for Bone-Conducted Speech," by T. Tamiya et al., Interspeech 2004—ICSLP 8th International Conference on Spoken Language Processing ICC Jeju, Jeju Island, Korea, Oct. 4-8, 2004, 4 pages.

(Continued)

*Primary Examiner* — Bhavesh M Mehta
*Assistant Examiner* — Darioush Agahi
(74) *Attorney, Agent, or Firm* — Saile Ackerman LLC; Stephen B. Ackerman

(57) ABSTRACT

A key word detection apparatus and a method for low-power voice-activated devices are presented. A first signal processing module operates with a first transducer to receive an incoming signal and generates a first sample. A second signal processing module operates with a second transducer which receives an incoming signal and generates a second sample. In summary, a signal processing system, in particular a key word detection system, has a first low power module that wakes up a second higher power module. The second module uses signals from the first module in order to improve accuracy of key word detection or other signal processing tasks.

15 Claims, 8 Drawing Sheets

(56) References Cited

U.S. PATENT DOCUMENTS

2019/0207777 A1* 7/2019 Patel ................ H04L 49/90
2020/0227063 A1* 7/2020 Dickins .............. H04S 7/30

OTHER PUBLICATIONS

Digital Signal Processing, Unit 8: Linear Prediction, Feb. 19, 2019, https://www.phon.ucl.ac.uk/cources/spsci/dsp/Ipc.html, pp. 1-8.

* cited by examiner

| Instance | SCORE | | | | | | |
|---|---|---|---|---|---|---|---|
| | 1 | 2 | 3 | 4 | 5 | 6 | 7 |
| Orig | 686 | 935 | 996 | 1024 | 954 | 622 | 1024 |
| alexa_es_noVPU_20ms | 778 | 739 | 840 | 1024 | 808 | 514 | 1014 |
| alexa_es_noVPU_40ms | 920 | 787 | 896 | 1022 | 549 | 0 | 840 |
| alexa_es_noVPU_60ms | 512 | 884 | 804 | 1023 | 908 | 0 | 873 |
| alexa_es_noVPU_80ms | 0 | 0 | 0 | 930 | 958 | 0 | 666 |
| alexa_es_noVPU_100ms | 0 | 0 | 0 | 0 | 0 | 0 | 0 |
| alexa_es_VPU_20ms | 572 | 860 | 942 | 1023 | 945 | 763 | 988 |
| alexa_es_VPU_40ms | 849 | 927 | 921 | 1021 | 663 | 666 | 1000 |
| alexa_es_VPU_60ms | 703 | 921 | 764 | 1004 | 670 | 564 | 641 |
| alexa_es_VPU_80ms | 902 | 676 | 905 | 934 | 918 | 843 | 995 |
| alexa_es_VPU_100ms | 879 | 935 | 880 | 0 | 948 | 0 | 756 |

FIG. 7

SIGNAL PROCESSING

TECHNICAL FIELD

The present disclosure relates to signal processing, and in particular but not exclusively to key word detection (KWD) and to a key word detection apparatus for low-power voice-activated devices.

BACKGROUND

A signal is a function that conveys information about the behavior or attributes of a phenomenon. Signals may for example comprise audio, video, speech, image, communication, geophysical, sonar, radar, or musical information.

Signal processing is key to engineering disciplines, such as electrical engineering, which deal with the design, study and implementation of systems involving transmission, storage and manipulation of information. Signal processing can be carried out by appropriate circuitry, which implements algorithms to analyse and manipulate received data to extract useful information and to interpret the meaning of the signals which are received by the signal processing circuit.

Audio signal processing is a sub-field of signal processing that is concerned with the electronic manipulation of audio signals, either in digital or analog format.

In modern electronic systems there is a continuing drive to reduce power consumption. This is seen in particular in consumer electronic devices and mobile devices where the length of battery life is a key factor in the user experience. In various fields it is known to have different power domains so that a first low power domain circuit waits for an event and then wakes up a higher power domain circuit only when it is needed. This is a well known general power saving technique that increases the efficiency of modern electronic systems in various contexts.

In the context of audio processing, it is known to have systems where a first component listens for a trigger and wakes up a second higher powered component. However, this means that the second component is delayed in waking up and so can miss out on a portion in time of the signal which it is designed to process.

As an example application, we consider voice activated devices. These are devices that can be activated by the user via a vocal command, namely a "key word", and have become a focus topic in the fast-growing market of wireless audio accessory products. One popular example is true wireless (TWS) headsets which are increasingly equipped with voice control user interface.

A fundamental characteristic required in modern wireless devices is the capability to operate at low power to allow for long battery durability. However, operating at low-power imposes some limitations on the choice of components and can substantially impact the key word detection accuracy, which in turn affects consumers' experience.

FIG. 1 shows a typical apparatus for key word detection in voice activated audio devices that need to operate at low power. The apparatus 100 comprises a first signal processing module 110, a second signal processing module 120, a first transducer 130 and a second transducer 140. The first signal processing module 110 comprises a voice activity detection (VAD) circuit 111 and the second signal processing module 120 comprises a key word detection circuit 121.

The first transducer 130 is coupled with the first signal processing module 110 and the second transducer 140 is coupled with the second signal processing module 120. Moreover, the first signal processing module 110 may be connected to the second signal processing module 120.

The first transducer 130 and the first signal processing module 110 are configured to operate at a lower power than the second transducer 140 and the second processing module 120.

In an example, the lower-power transducer 130 might comprise a bone sensor and the higher-quality transducer 140 might comprise an analogue microphone (AMIC). Bone sensors have the inherent benefit that they are only sensitive to the speaker's voice and not to external noise, but they have the disadvantage of exhibiting poor signal bandwidth (<1 kHz) due to the voice-bone transfer function.

In general, the quality of the samples generated by the transducer 130 will be lower than the quality of the samples generated by the second transducer 140, due to both intrinsic construction properties of the detection elements used in the transducers and to properties given by configuration, such as their operation in different power-domains.

In operation, the first transducer 130 and the first signal processing module 110 are in an always-on status, while the second transducer 140 and the second signal processing module 120 are normally sleeping. The first transducer 130 receives in input an audio signal 150 and generates a sample 131 which is passed to the first signal processing module 110. The voice activity detection circuit 111 continuously processes the audio samples 131 generated by the transducer 130 and is configured to generate a wake up signal 160 for activating the second transducer 140 and the second signal processing module 120 when a human voice 170 is detected.

When active, the second transducer 140 receives in input the audio signal 150 and generates a sample 141 which is passed to the second signal processing module 120. The key word detection circuit 121 processes the audio samples generated by the transducer 140 and is configured to detect the presence of a key word.

The system 100 allows to perform key word detection at low power. However, a delay occurs between the beginning of the voice activity 170 and the full wake-up of the higher-power components 120 and 140. Many factors might contribute to the delay, including:

a delay of the VAD circuit 111;

presence of ambient noise that can cause the onset of the spoken key word to be missed, with the triggering on at a later point in time;

boot time of higher-power signal processing module 120;

time necessary to enable the higher-quality detection transducer 140.

This delay can cause the first part of the key word to be missed and lower the key word detection accuracy of the key word detection circuit 121. For example, for an overall turn-on time of about 30 ms, the hit rate can decrease from >90% (accuracy with the higher-power components always on) to 70-80%, which is below customer acceptable levels.

SUMMARY

It is an object of the disclosure to address one or more of the above-mentioned limitations.

According to a first aspect of the disclosure there is provided an apparatus comprising: a first signal processing module configured to operate with a first transducer which receives an incoming signal and generates a first sample; a second signal processing module configured to operate with a second transducer which receives an incoming signal and generates a second sample; wherein the first signal processing module is configured to generate a wakeup signal for activating the second signal processing module upon detection of a triggering event; and the second signal processing module is configured to process the first sample in combination with the second sample.

Optionally, the first signal processing module includes a voice activity detection circuit configured to detect the presence of a human voice; the second signal processing module includes a key word detection circuit configured to detect the presence of a key word; and the triggering event is the detection of the presence of a human voice by the voice activity detection circuit.

Optionally, the voice activity detection circuit processes lower quality audio and the key word detection circuit processes higher quality audio.

Optionally, the first signal processing module is in a first power domain and the second signal processing module is in a second power domain.

Optionally, the first power domain is a low power domain compared to the second power domain.

Optionally, the apparatus comprises a memory configured to store said first sample.

Optionally, said first sample comprises audio data generated by the first transducer throughout the course of a time period at least between a start time of the triggering event and a time when the second transducer starts to generate said second sample.

Optionally, the apparatus comprises a first acoustic transducer arranged to provide an input to the first signal processing module; and a second acoustic transducer arranged to provide said second sample to the second signal processing module.

Optionally, the first acoustic transducer comprises a bone sensor and the second acoustic transducer comprises an analog microphone.

Optionally, the first sample generated by the first transducer is pre-processed before being processed by the second signal processing module.

Optionally, the pre-processing comprises matching one or more of amplitude, phase and sample rate.

Optionally, the pre-processing includes improving a quality of the first sample generated by the first signal processing module by applying a formant shaping filter or by applying an adaptive enhancement filter that is trained by a detection quality of the second transducer.

Optionally, the combination of the first and second samples includes prepending the first sample to the second sample.

Optionally, a single transducer functions as both the first transducer and the second transducer.

Optionally, the combination of the first and second samples includes a continuous combination of the first sample with the second sample.

According to a first aspect of the disclosure there is provided a method for keyword detection, the method comprising: receiving at a first signal processing module a first sample generated by a first transducer; generating a wakeup signal upon detection by said first signal processing module of a triggering event; receiving at a second signal processing module said first sample and a second sample generated by a second transducer; processing by said second signal processing module said first sample in combination with said second sample.

The method of the second aspect may also incorporate using or providing features of the first aspect and various other steps as disclosed herein.

BRIEF DESCRIPTION OF THE DRAWINGS

The disclosure is described in further detail below by way of example and with reference to the accompanying drawings, in which:

FIG. 7 is a table illustrating the results of a simulation of various KWD apparatuses.

DESCRIPTION

Figure 1:
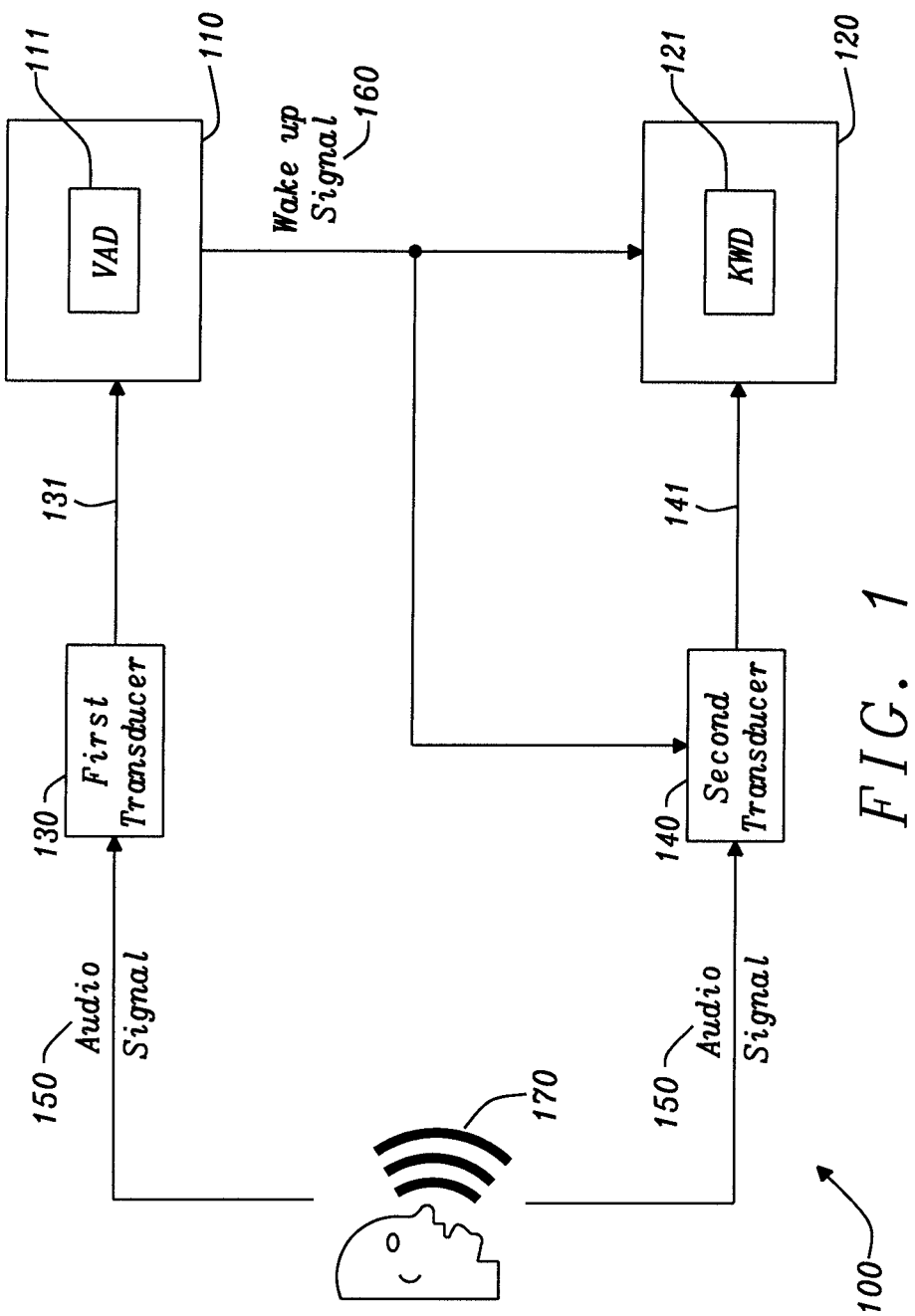
FIG. 1 is a schematic diagram of a low-power KWD apparatus according to the prior art.
Figure 2:
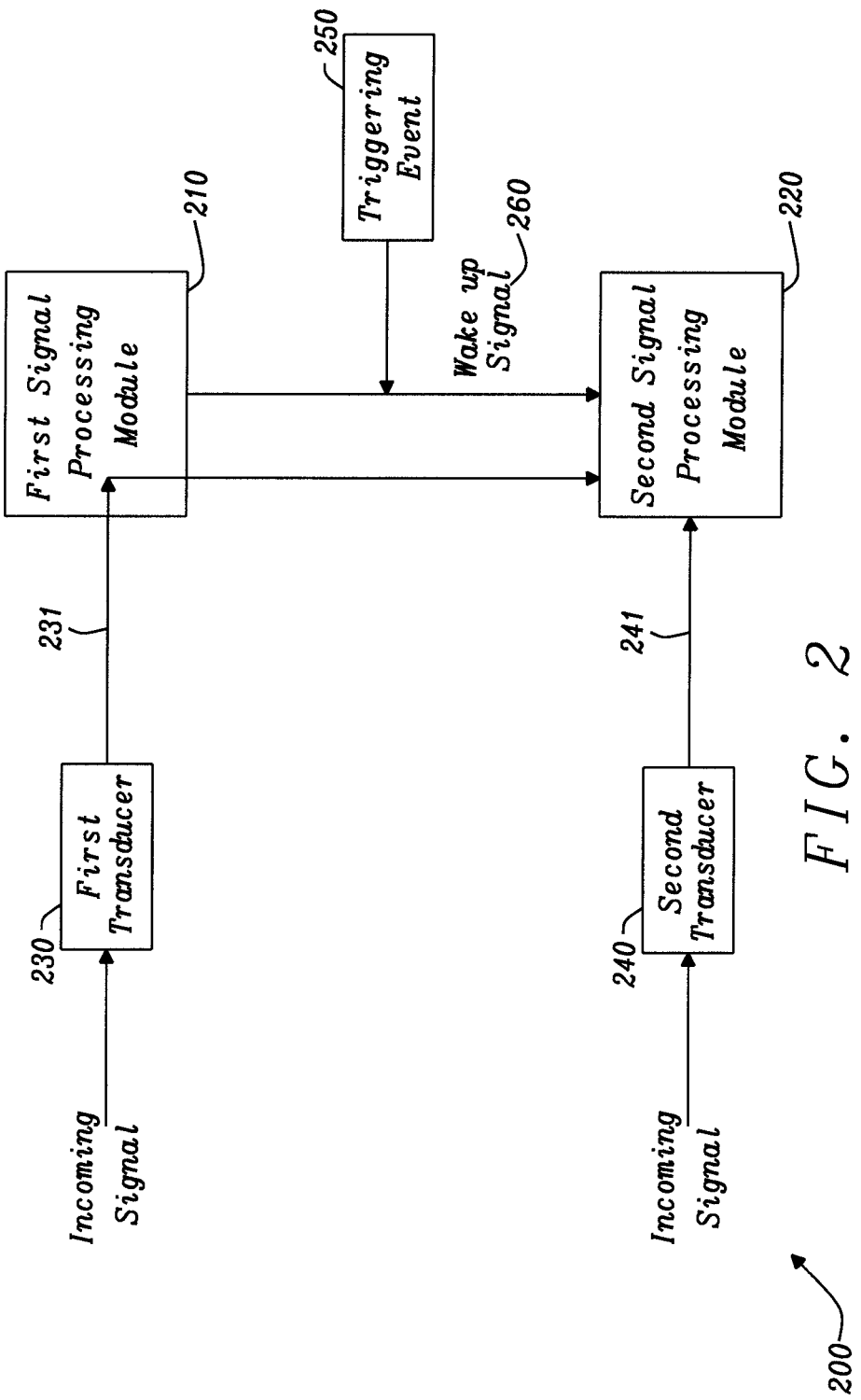
FIG. 2 is a diagram of an apparatus according to the present disclosure.

FIG. 2 is a diagram of an apparatus according to the present disclosure. The apparatus 200 includes a first signal processing module 210 and a second signal processing module 220.

The first signal processing module 210 is communicatively connected to the second signal processing module 220. The first signal processing module 210 is configured to operate with a first transducer 230 which receives an incoming signal and generates a first sample 231. Moreover, the first signal processing module 210 is configured to detect a triggering event 250 and to generate a wake up signal 260 for activating the second signal processing module 220 upon detection of the triggering event 250. The second signal processing module 220 is configured to operate with a second transducer 240 which receives an incoming signal and generates a second sample 241. Moreover, the second signal processing module 220 is configured to process the first sample 231 in combination with the second sample 241.

In operation, the first signal processing module 210 continuously receives samples 231 and waits for a triggering event 250. When a triggering event 250 is detected, the signal processing module 210 generates the wake-up signal 260 for activating the second signal processing module 220. When active, the second signal processing module 220 receives a sample 241 generated by the second transducer 240 and processes the sample 241 in combination with the sample 231.

Figure 3:
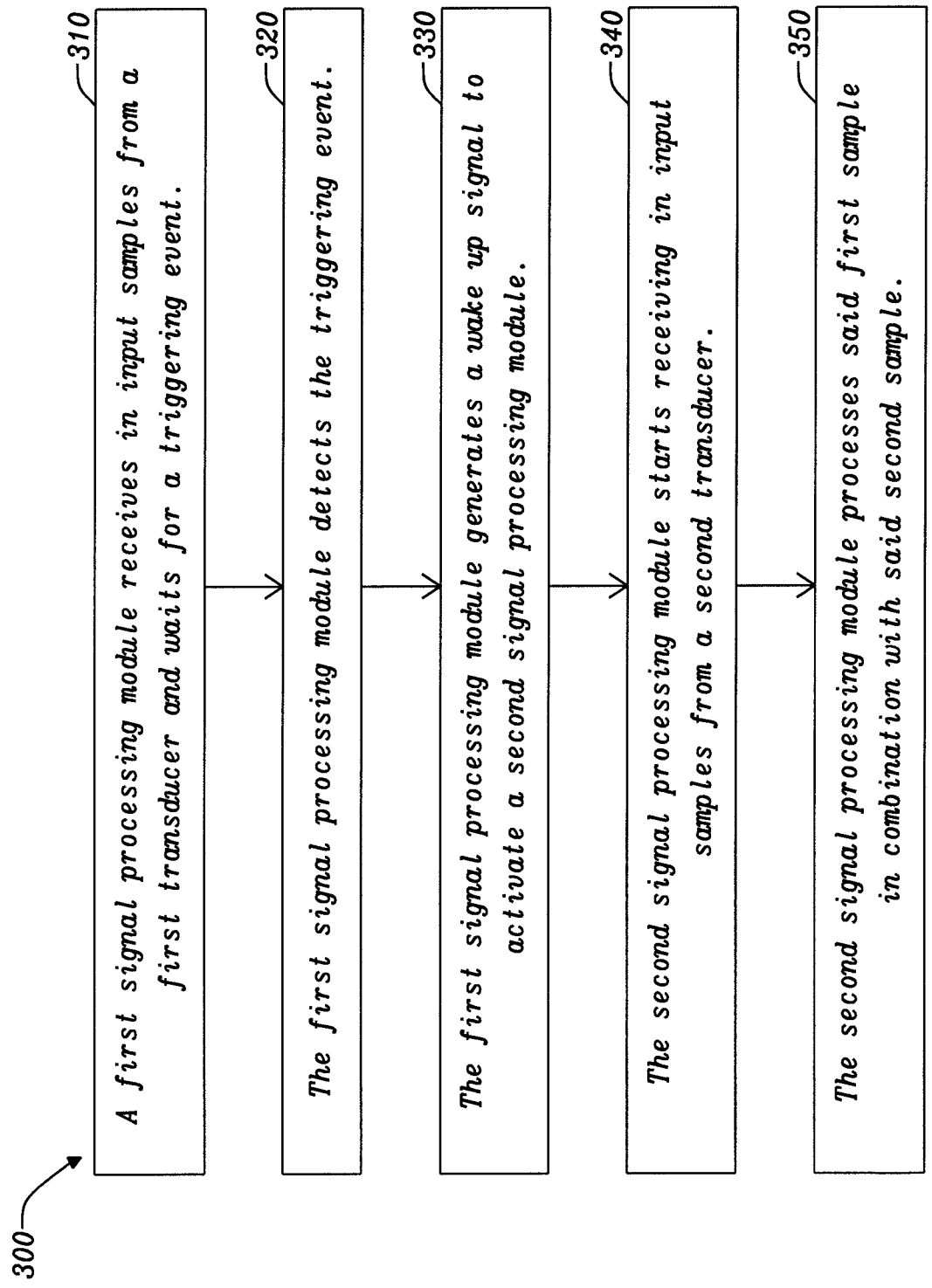
FIG. 3 is a flowchart illustrating a method according to the present disclosure.

The operation of the apparatus 200 is further illustrated in FIG. 3. FIG. 3 is a flowchart illustrating a method according to the present disclosure. At step 310 the first signal processing module 210 receives input samples 231 from a first transducer 230 and waits for a triggering event 250. At step 320 the first signal processing module 210 detects the triggering event 250. At step 330 the first signal processing module 210 generates a wake-up signal 260 for activating a second signal processing module 220. At step 340 the second signal processing module 220 starts receiving input samples 241 from a second transducer 240. At step 350 the second signal processing module 220 processes said first sample 231 in combination with said second sample 241.

Figure 4:
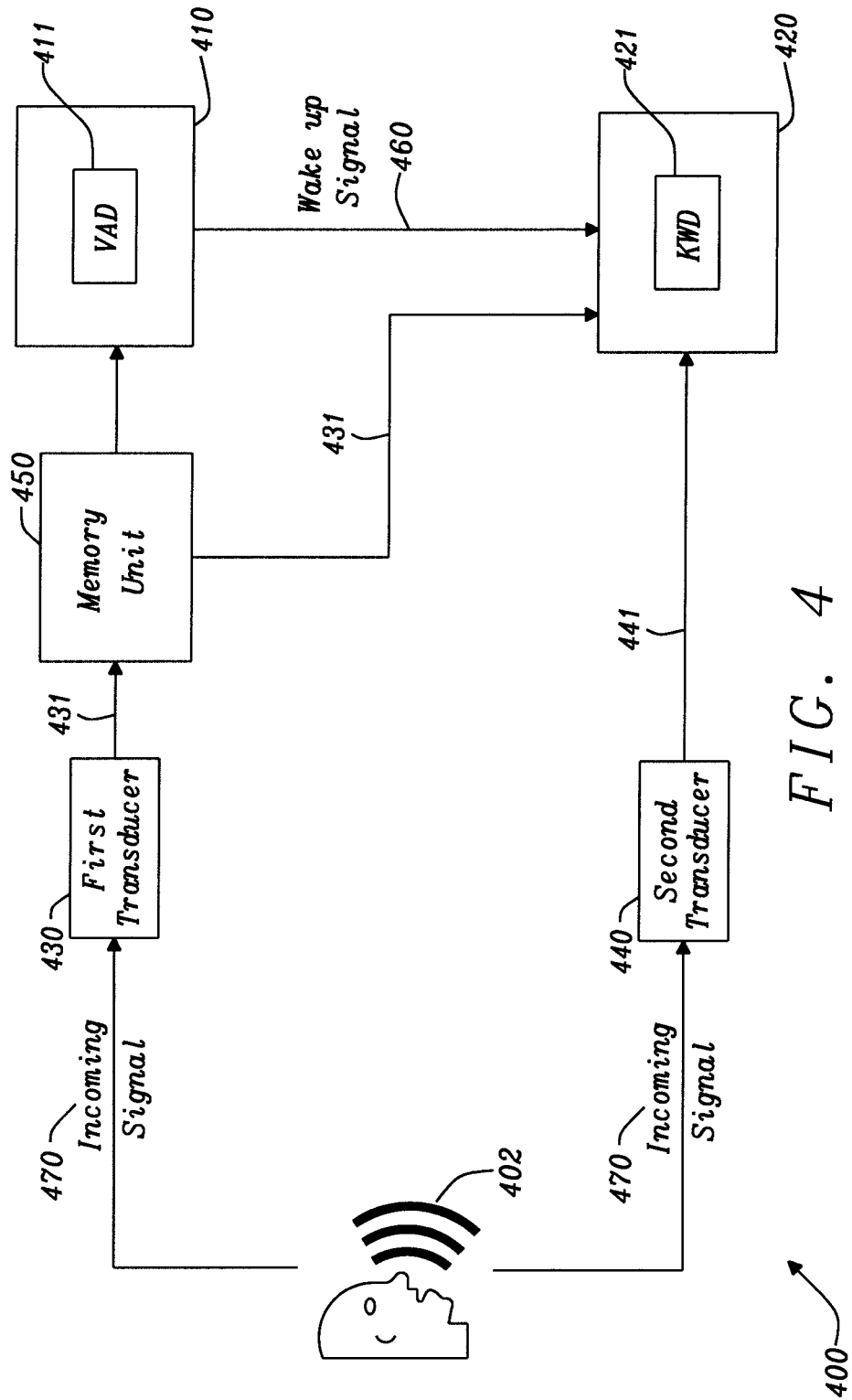
FIG. 4 is a diagram of a keyword detection apparatus according to a specific embodiment of the present disclosure.

FIG. 4 is a diagram of a keyword detection apparatus according to an embodiment of the present disclosure. The apparatus 400 includes a first signal processing module 410, a second signal processing module 420, a first transducer 430, a second transducer 440 and a memory 450.

The first transducer 430 is connected to the memory 450. The memory 450 is connected to the first signal processing module 410 and to the second signal processing module 420. The second transducer 440 is connected to the second signal processing module 420. Moreover, the first signal processing module 410 is connected to the second signal processing module 420.

The first signal processing module 410 comprises a voice-activity detection circuit 411 configured to detect the presence of a human voice and the second signal processing module 420 comprises a key word detection circuit 421 configured to detect the presence of a key word.

In operation, the apparatus 400 is analogous to the apparatus 200 of FIG. 2. In this specific embodiment the triggering event 250 is the detection of a voice activity 402.

In detail, the first transducer 430 continuously receives an incoming audio signal 470 and generates a sample 431 which is saved into the memory 450. The first transducer and the first module may be always on while the second transducer and module are sleeping until they receive the wake up signal. The first signal processing module 410 reads the sample 431 from the memory 450 and the VAD 411 processes the sample 431 to establish whether a voice activity 402 is present. Upon detection of a voice activity, the first signal processing module 410 generates a wake up signal 460 for activating the second signal processing module 421.

The second transducer 440 also receives the audio signal 470 and generates a sample 441. When active, the second signal processing module 420 receives the sample 441 from the second transducer 440 and the sample 431 from the memory 450 and the keyword detection circuit 421 processes the sample 431 in combination with the sample 441 in order to detect the presence of a predetermined key word.

A typical application of the apparatus 400 is in voice activated devices that need to operate at low power regimes. In such devices, battery power saving is essential for an optimal user experience, therefore it is common to have a voice pick-up circuit that works at low power and continuously generates a low-quality sample for voice activity detection and a key word detection circuit that works at higher power and is only activated after a voice has been detected by the voice pick-up circuit.

An example of such device is wireless headphones or earbuds. The operation of apparatus 400 and its advantages will be further explained with reference to this specific embodiment.

For a specific case where apparatus 400 is deployed in wireless headphones or earbuds, the first signal processing module 410 and the first transducer 430 are configured to operate at lower power than the second signal processing module 420 and the second transducer 440. Consequently, the audio samples 431 generated by the first transducer 430 are of a lower quality than the audio samples 441 generated by the second transducer 440. Moreover, the second transducer 440 is activated at the same time as the second signal processing module 420.

The first transducer could be for example a bone sensor and the second transducer could be an analog microphone.

In operation, the low quality audio samples 431 are continuously stored in the memory 450 so that the VAD 411 can process them and establish whether the user has started speaking or not. If a voice activity 402 is detected, the first signal processing module 410 wakes up the second signal processing module 420 and the second transducer 440, which starts sending higher quality audio samples to the second signal processing module 440.

In existing apparatus, the output of the second transducer 440 would be passed directly to the keyword detection circuit 421, which then identifies whether a keyword has been pronounced or not. However, as previously explained, this approach might be subject to inaccuracy due to the delay between the start time of the voice activity 402 and the start time of the detection by the second transducer 440. Such delay causes missing a part of the keyword and can reduce the hit-rate of the KWD circuit 421.

According to an embodiment of the present disclosure, the second signal processing module 420 reads in the sample 431 stored in the memory 450 and the KWD circuit 421 processes the higher quality sample 441 in combination with the lower quality sample 431, resulting in better accuracy.

The combination of the sample 431 and 441 can be achieved in various different ways. In the simplest case, the combination consists of pre-pending the sample 431 from the first signal processing module 410 to the sample 441 from the first signal processing module 420.

In most cases the audio samples generated by the first signal processing module will be different from the audio samples generated by the second signal processing module, in which case the first sample 431 can be pre-processed before being prepended to the second sample 441. The pre-processing can suitably be carried by the second signal processing module 420.

For the specific implementation where the first transducer 430 is a bone sensor, the sample 431 will have different spectral properties than the sample 441 and it will need to be adjusted in amplitude, frequency and phase before being prepended. This case is illustrated in FIG. 5.

Figure 5:
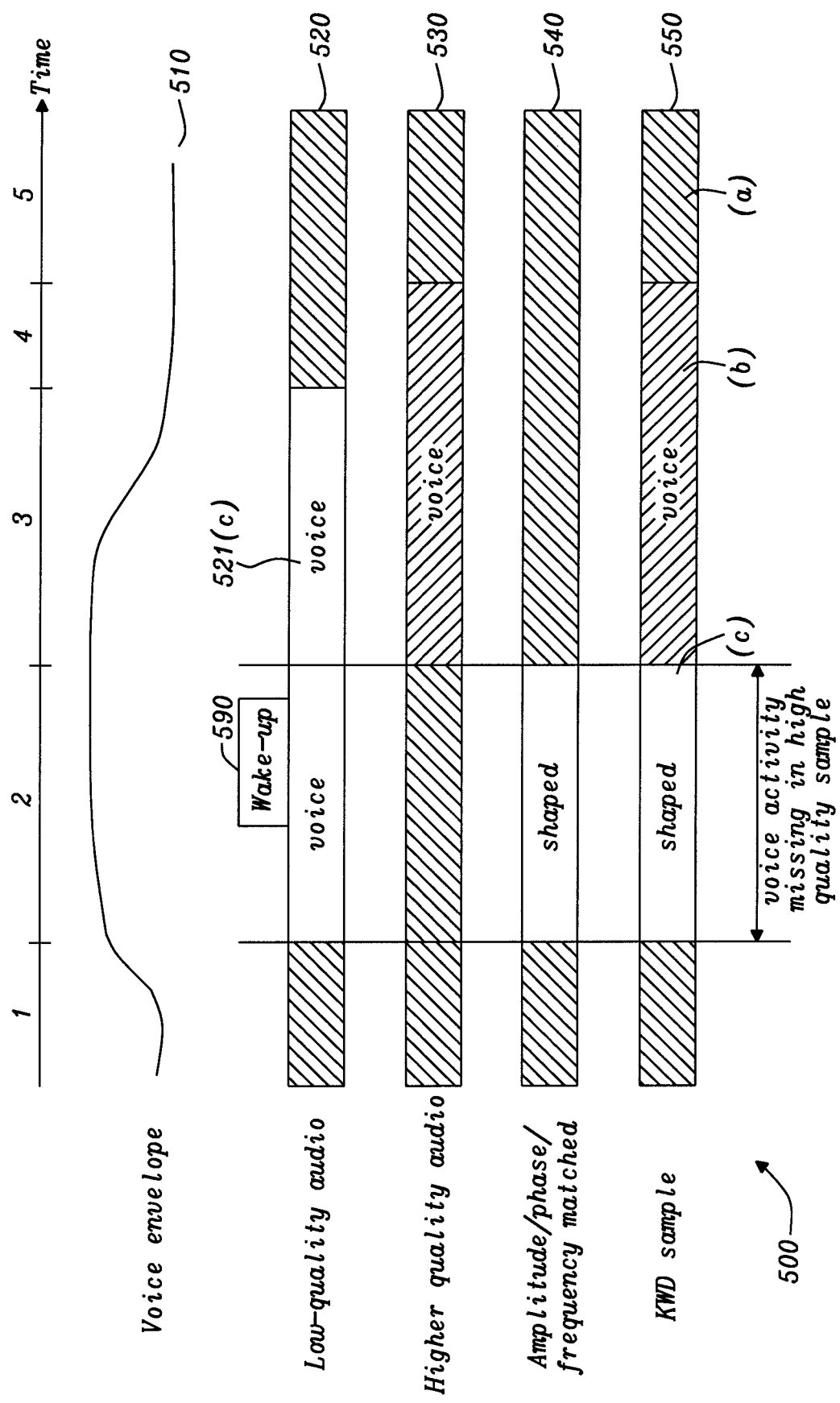
FIG. 5 is a time diagram illustrating the time dependence of various signals for a specific implementation of the apparatus of FIG. 4.
Figure 6A:
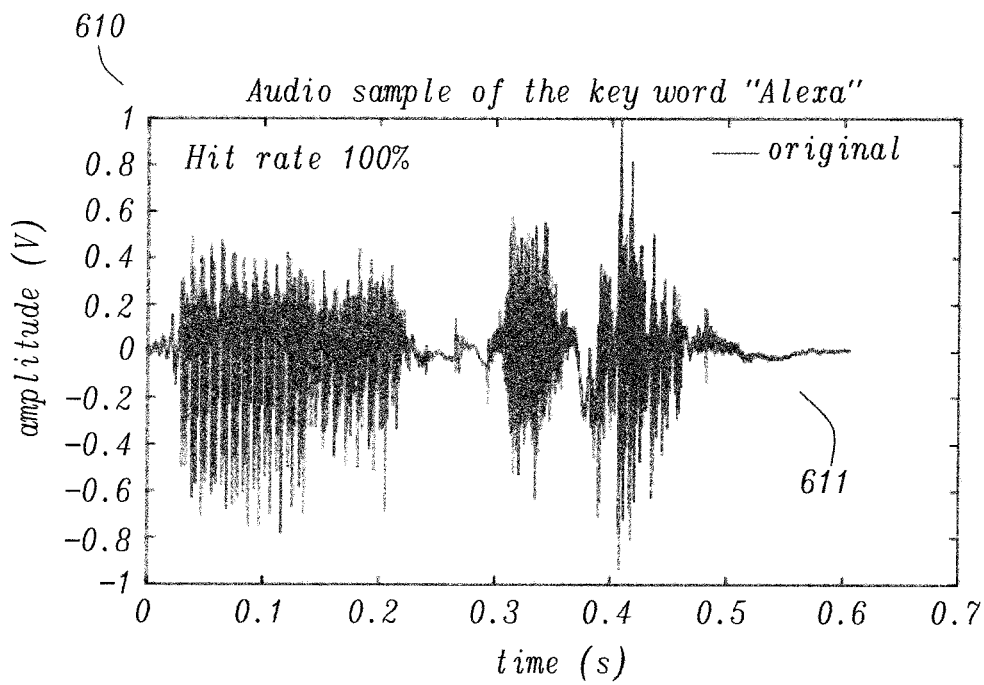
FIGS. 6A, 6B, 6C and 6D are simulations illustrating the performance of different KWD apparatuses.
Figure 6B:
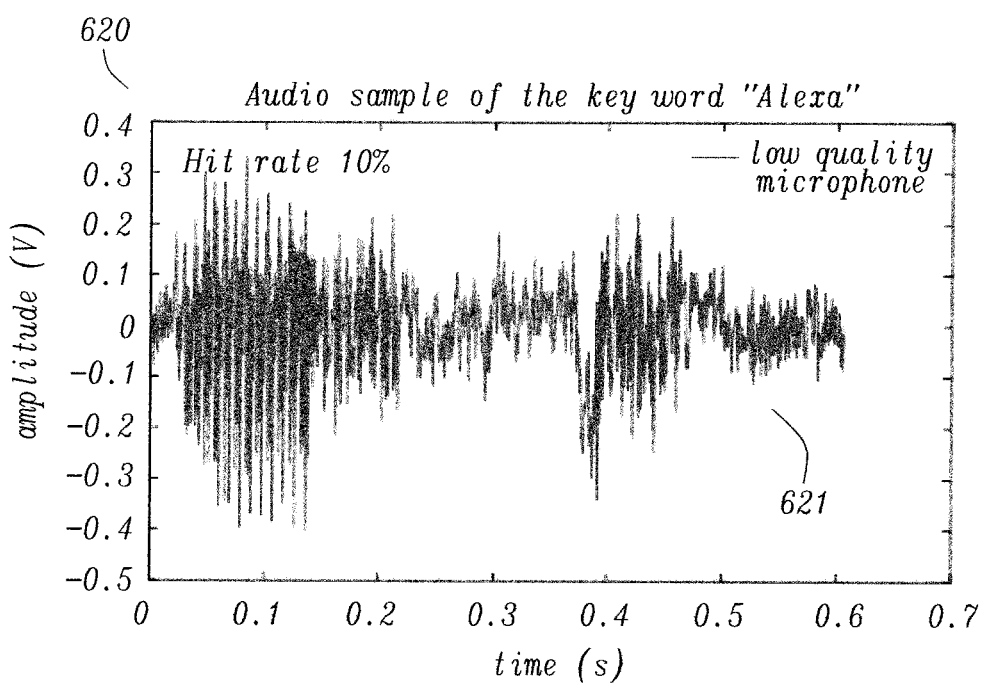
Figure 6C:
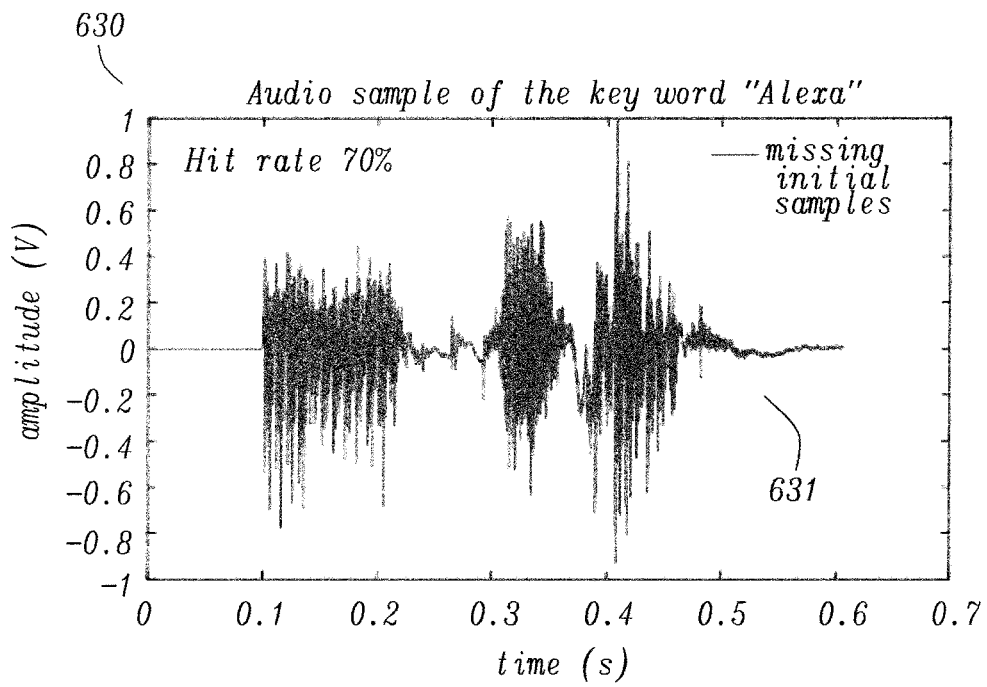
Figure 6D:
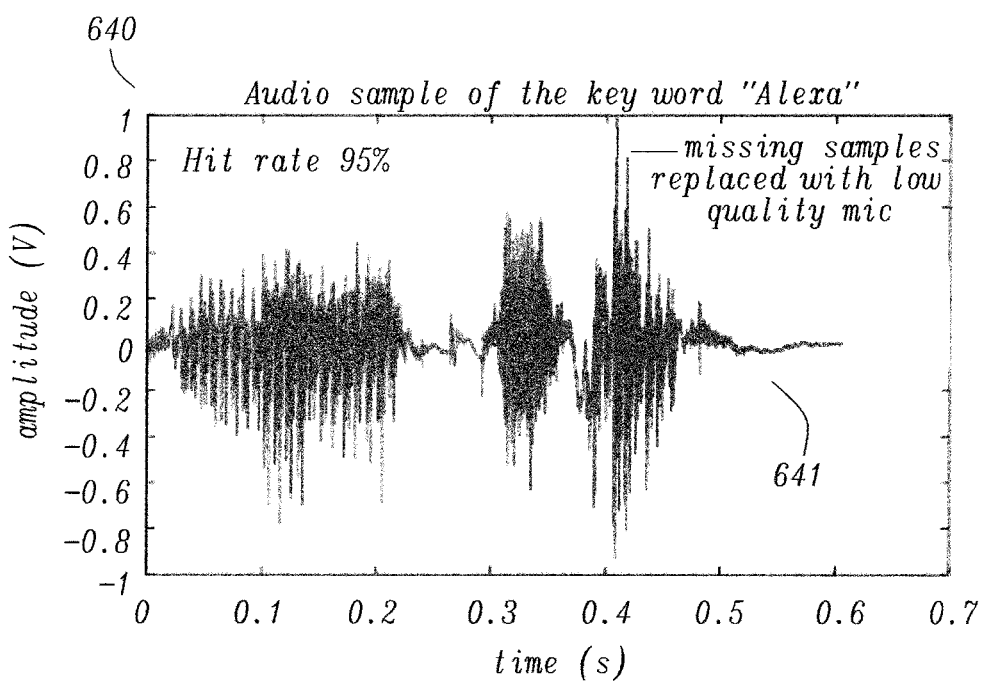

FIG. 5 is a time diagram illustrating the time evolution of various signals for a specific implementation of the apparatus of FIG. 4. The diagram 500 will be explained with reference to some elements of FIG. 4. The diagram 500 includes a voice envelope 510, a first low-quality audio sample 520, a second higher-quality audio sample 530, a matched audio sample 540 and a KWD sample 550.

The voice envelope 510 represents the voice activity 402 of FIG. 4. The first low-quality audio sample 520 represents the sample generated by the first transducer 430 and stored in the memory 450. The second higher-quality audio sample 530 represents the sample generated by the second transducer 440 after it has been activated. The matched audio sample 540 represents the sample 431 after it has been pre-processed to adjust its amplitude, frequency and phase. The KWD sample 550 represents the sample processed by the key word detection circuit 421 after the samples 431 and 441 have been pre-processed and combined.

In each of the samples 520, 530, 540 and 550, the striped sections (a) correspond to zero audio signal, the dotted sections (b) correspond to higher-quality audio signal and the solid-fill sections (c) correspond to low-quality audio signal. Moreover, the solid-fill section 521(*c*) corresponds to low-quality audio signal that is discarded and the checked section 590 represents a wake-up signal.

The time interval illustrated in the time diagram 500 can be divided into five time steps. In step 1 there is no voice activity. At step 2 the voice activity starts and the first transducer 430 generates a first non-zero audio sample 520(*c*). This sample can be saved in the memory unit 450 for later use. At step 2 the second transducer 440 is not active yet and therefore the high-quality audio sample 530 has zero signal. At some point during step 2 the first signal processing module 410 sends a wake-up signal 590 to the second signal processing module 420 and to the second transducer 440 which enters in operation.

At step 3 both the first and the second transducers 430 and 440 are detecting the voice activity 510, therefore the low-quality sample 520 has non-zero low-quality signal and the higher-quality audio sample 530 has non-zero higher-quality signal.

At step 4 the first transducer 430 has started generating a new low quality sample to be input into the memory 450, therefore the audio sample 520 has zero signal, while the audio sample 530 still has non-zero higher-quality signal. At time 5 the voice-activity 510 has ended and both the audio samples 520 and 530 have zero audio signal.

Due to the delayed activation of the second transducer 440 after the voice activity 510 has started, some of the voice activity is missing from the higher-quality audio sample 530.

The matched audio sample 540 is a replica of the low-quality audio sample 520 with the section 521(c) omitted and with the non-zero audio signal adjusted in amplitude, frequency and phase to match the higher-quality audio sample 530 of the second transducer 440. The section 521(c) is removed because higher-quality audio signal is available from the second transducer 440 at that time step.

The KWD sample 550 is a mixed low- and higher-quality audio signal obtained by prepending the non-zero portion of the matched audio sample 540 to the non-zero portion of the higher-quality audio sample 530. The sample 550, has optimal characteristic for keyword detection and is used by the KWD circuit 421 as input for a KWD algorithm.

It will be appreciated that other implementations of the apparatus 400 are possible. For example, in a different embodiment a single transducer can be provided which can function as both the first transducer 430 and the second transducer 440.

Also, the memory 450 could be embedded in either one of the two signal processing modules 410 and 420.

In some specific applications, the apparatus may perform additional processing steps of the sample 431 and 441. The apparatus might pre-process the sample 431 before it is stored in the memory unit 450 or before it is combined with the sample 441 and it might pre-process the sample 441 before it is passed to the KWD circuit 421.

For example, the sample 431 could be replaced by a compressed replica or any alternative representation for optimal memory usage before being stored in the memory unit 450.

In a specific implementation that uses a bone sensor as the first transducer 430 and a high-quality analogue microphone (AMIC) as the second transducer 440, the apparatus might improve the quality of the bone sensor's output by applying a speech reconstruction filter or any other type of formant shaping filter. Alternatively, the quality of the bone sensor's sample could be improved by applying an adaptive enhancement filter that is trained by the quality detection of the AMIC.

The disclosure provides for a second signal processing module to process a sample generated by a first transducer which is associated with a different first signal processing module in combination with a sample generated by a second transducer which is associated with that second signal processing module.

As mentioned above, according to certain embodiments this combination can comprise of pre-pending the sample 431 from the first signal processing module 410 to the sample 441 from the first signal processing module 420.

However, in other implementations, the combination can comprise a continuous combination of data streams from different first and second transducers. After the second signal processing module has been woken up, the first signal processing module can remain active and contribute continuing samples which are processed in continuous combination with the samples from the second signal processing module. Even if the first signal processing module generates lower quality samples with respect to the second signal processing module, the additional information from the first signal processing module can still be useful and can improve key word detection accuracy.

As an example, the apparatus could continuously combine the resulting samples with specific frequency bands from the AMIC, such frequency bands being selected based on the bone sensor's properties. This additional processing step would enable the creation of a synthetic signal with optimum characteristic for KWD accuracy.

FIGS. 6A, 6B, 6C and 6D are simulations comparing the performance of different keyword detection apparatuses. The plots 610, 620, 630, 640 represent the amplitude (in volts) of four audio samples 611, 621, 631 and 641 as a function of time.

With reference to an implementation of apparatus 400 that uses a bone sensor as the first transducer 430 and a higher quality analogue microphone as the second transducer 440, the signal 611 is a high-quality audio sample of the keyword "Alexa". The signal 621 is a filtered replica of signal 611 with added noise to mimic the voice-detection quality level of a generic bone sensor, the signal 631 is a replica of the signal 611 with the first 100 ms muted to mimic the delayed detection by the analog microphone and the signal 641 is a replica of the signal 611 with the first 100 ms muted and replaced by the first 100 ms of the signal 621.

In a first simulation, representative of an ideal scenario, the signal 611 is fed to the KWD algorithm and the algorithm successfully recognizes the keyword every time, therefore the hit rate, or accuracy, is 100%. In a second simulation, representative of a scenario where only the sample of the bone sensor is used, the signal 621 is fed to the KWD algorithm and the accuracy decreases to 10% which is much below customer acceptable levels. In a third simulation, representative of the prior-art where only the sample of the analog microphone is used, the signal 631 is fed to the KWD algorithm and the accuracy is 70%. In a fourth simulation, representative of the present disclosure where both the sample of the bone sensor and the sample of the analog microphone are used, the signal 641 is fed to the KWD algorithm and the accuracy is 95%, which is a considerable improvement compared to the 70% accuracy obtained for signal 631 and therefore to the prior-art.

FIG. 7 is a table illustrating the results of various simulations of keyword detection by different apparatuses. The columns 710 represent seven different voice samples numbered from 1 to 7. The row 720 corresponds to the plot 610 of FIG. 6: in this simulation the keyword detection algorithm is fed with a complete voice sample of the keyword. The 5 rows 730 correspond to the plot 630 of FIG. 6: in this simulation the keyword detection algorithm is fed with a replica of the complete voice sample of the keyword where the first N ms have been muted. We will call this scenario the "muted scenario". Five different N values are simulated in the muted scenario: 20 ms, 40 ms, 60 ms, 80 ms and 100 ms.

The 5 rows 740 correspond to the plot 640 of FIG. 6: in this simulation the keyword detection algorithm is fed with a replicase of the complete voice sample where the first N ms have been replaced with the first N ms of a filtered replica with noise added, as previously explained. We will call this scenario the "prepended scenario". Five different N values are simulated in the prepended scenario: 20 ms, 40 ms, 60 ms, 80 ms and 100 ms.

The values in the cells 750 are indicative quality indicators of the detection algorithm, pertaining to a single instance of KWD activity. From these indicators the relative quality of the results for different simulation scenarios can be understood. It will be appreciated that various different techniques can be used for the generation of quality indicators, as will be known to those skilled in the art.

The table 700 shows that for voice sample 6, the keyword detector simulated in the muted scenario fails to detect the keyword for N equal 40 or higher, whereas in the prepended scenario, keyword detection is successful up to 80 ms. Moreover, for voice samples 1, 2 and 3, the prepended scenario shows an improvement compared to the muted scenario at 80 ms. Since the simulation used an ideal voice activity detector, it is expected that this improvement will become even more significant in the final product if the voice activity detection trigger is not ideal and/or in case the overall signal quality is reduced by other factors.

In conclusion, an apparatus and method have been presented that improves signal processing in systems which rely on a low power always-on module listening for a trigger event and waking up a higher power module. One particular case where this provides utility is the field of keyword detection accuracy in voice-activated devices, directly improving end consumer experience.

A skilled person will appreciate that variations of the disclosed arrangements are possible without departing from the disclosure. Accordingly, the above description of the specific embodiment is made by way of example only and not for the purposes of limitation. It will be clear to the skilled person that minor modifications may be made without significant changes to the operation described.

What is claimed is:

1. An apparatus for processing electronic signals comprising:
   a first signal processing module configured to operate with a first transducer which receives an incoming signal and generates a first electronic signal comprising a first sample;
   a second signal processing module configured to operate with a second transducer which receives an incoming signal and, when active, generates a second electronic signal comprising a second sample; wherein
   the first signal processing module is configured to generate a wakeup signal for activating the second signal processing module and the second transducer upon detection of a triggering event; and
   the second signal processing module, when active, is configured to process the first electronic signal comprising the first sample in combination with the second electronic signal comprising the second sample;
   wherein the combination of the first and second samples includes prepending the first sample to the second sample.

2. The apparatus of claim 1, wherein:
   the first signal processing module includes a voice activity detection circuit configured to detect the presence of a human voice;
   the second signal processing module includes a key word detection circuit configured to detect the presence of a key word; and
   the triggering event is the detection of the presence of a human voice by the voice activity detection circuit.

3. The apparatus of claim 2, wherein the voice activity detection circuit processes lower quality audio and the key word detection circuit processes higher quality audio.

4. The apparatus of claim 1, wherein the first signal processing module is in a first power domain and the second signal processing module is in a second power domain.

5. The apparatus of claim 4, wherein the first power domain is a low power domain compared to the second power domain.

6. The apparatus of claim 1, comprising a memory configured to store said first sample.

7. The apparatus of claim 1, wherein said first sample comprises audio data generated by the first transducer throughout the course of a time period at least between a start time of the triggering event and a time when the second transducer starts to generate said second sample.

8. The apparatus of claim 1, comprising
   a first acoustic transducer arranged to provide an input to the first signal processing module; and
   a second acoustic transducer arranged to provide said second sample to the second signal processing module.

9. The apparatus of claim 8, wherein the first acoustic transducer comprises a bone sensor and the second acoustic transducer comprises an analog microphone.

10. The apparatus of claim 1, wherein the first sample generated by the first transducer is pre-processed before being processed by the second signal processing module.

11. The apparatus of claim 10, wherein the pre-processing comprises matching one or more of amplitude, phase and sample rate.

12. The apparatus of claim 10, wherein the pre-processing includes improving a quality of the first sample generated by the first signal processing module by applying a formant shaping filter or by applying an adaptive enhancement filter that is trained by a detection quality of the second transducer.

13. The apparatus of claim 1 wherein a single transducer functions as both the first transducer and the second transducer.

14. The apparatus of claim 1, wherein the combination of the first and second samples includes a continuous combination of the first sample with the second sample.

15. A method for keyword detection, the method comprising:
   receiving at a first signal processing module a first electronic signal comprising a first sample generated by a first transducer;
   generating a wakeup signal upon detection by said first signal processing module of a triggering event;
   activating a second signal processing module and a second transducer using the wakeup signal;
   receiving at the second signal processing module said first electronic signal comprising said first sample and a second electronic signal comprising a second sample generated by a second transducer when active; and
   processing by said second signal processing module said first electronic signal comprising said first sample in combination with said second electronic signal comprising said second sample
   wherein the combination of the first and second samples includes prepending the first sample to the second sample.

* * * * *